(12) United States Patent
Crue, Jr. et al.

(10) Patent No.: US 6,400,526 B2
(45) Date of Patent: Jun. 4, 2002

(54) ADVANCED WRITER FOR CHIP-ON-LOAD BEAM

(75) Inventors: Billy W. Crue, Jr.; Zhupei Shi, both of San Jose; Carlos Corona, Pleasanton; Mark D. Thomas, Hollister, all of CA (US)

(73) Assignee: Read-Rite Corporation, Fremont, CA (US)

( * ) Notice: Subject to any disclaimer, the term of this patent is extended or adjusted under 35 U.S.C. 154(b) by 25 days.

(21) Appl. No.: 09/320,168

(22) Filed: May 26, 1999

(51) Int. Cl.[7] .............................................. G11B 5/147
(52) U.S. Cl. ....................................................... 360/126
(58) Field of Search ................................. 360/126, 122, 360/123

(56) References Cited

U.S. PATENT DOCUMENTS

| | | | |
|---|---|---|---|
| 3,891,995 A | 6/1975 | Hanazono et al. ........... 360/123 |
| 4,052,749 A | 10/1977 | Nomura et al. ............. 360/123 |
| 4,241,367 A | 12/1980 | Nomura et al. ............. 360/127 |
| 4,318,148 A | 3/1982 | Kaminaka et al. .......... 360/126 |
| 4,416,056 A | 11/1983 | Takahashi ................ 29/603.24 |
| 4,458,279 A | 7/1984 | Katz ............................. 360/123 |
| 4,490,760 A | 12/1984 | Kaminaka et al. .......... 360/126 |
| 4,884,157 A | 11/1989 | Roberts et al. ............. 360/125 |
| 5,173,826 A | 12/1992 | Bischoff ...................... 360/126 |
| 5,668,689 A | 9/1997 | Schultz et al. .............. 360/317 |
| 5,694,276 A | 12/1997 | Shen et al. ................. 360/317 |
| 5,699,605 A | 12/1997 | Amin et al. ............. 29/603.14 |
| 5,734,534 A | 3/1998 | Yamamoto et al. ......... 360/123 |
| 5,796,564 A | 8/1998 | Shouji et al. ............... 360/123 |
| 6,034,848 A * | 3/2000 | Garfunkel et al. .......... 360/126 |
| 6,055,138 A * | 4/2000 | Shi ............................. 360/126 |
| 6,105,238 A * | 8/2000 | Chesnutt et al. ......... 29/603.14 |
| 6,191,918 B1 * | 2/2001 | Clarke et al. ............... 360/126 |
| 6,317,288 B1 * | 11/2001 | Sasaki ........................ 360/126 |

FOREIGN PATENT DOCUMENTS

| | | | |
|---|---|---|---|
| JP | 59-195314 | * | 11/1984 |
| JP | 5-46935 | * | 2/1993 |
| SU | 0705509 | * | 12/1979 |

* cited by examiner

Primary Examiner—Robert S. Tupper
Assistant Examiner—Julie Anne Watko
(74) Attorney, Agent, or Firm—Carr & Ferrell LLP

(57) ABSTRACT

A write element for recording data on a magnetic medium is provided having an impedance designed to substantially match the impedance of an electrical interconnection between it and a pre-amp chip located nearby on the load beam. Additional embodiments are directed to incorporating a read element with the write element to form a read/write head, and to further incorporate the read/write head into a magnetic disk drive. Further embodiments are directed towards the fabrication of the write element.

16 Claims, 13 Drawing Sheets

ADVANCED WRITER FOR CHIP-ON-LOAD BEAM

BACKGROUND OF THE INVENTION

This invention relates generally to magnetic data storage systems, more particularly to thin film read/write heads, and most particularly to a write element with an impedance tailored to be able to match the impedance of a shorten connector between a pre-amp chip and the write element, allowing for both higher data transfer rates and higher storage capacities.

Magnetic disk drives are used to store and retrieve data for digital electronic apparatuses such as computers. In FIGS. 1A and 1B, a magnetic disk data storage system 10 includes a sealed enclosure 12, a disk drive motor 14, and a magnetic disk, or media, 16 supported for rotation by a drive spindle S1 of motor 14. Also included are an actuator 18 and an arm 20 attached to an actuator spindle S2 of actuator 18. A suspension 22 is coupled at one end to the arm 20, and at its other end to a read/write head or transducer 24. The transducer 24 typically includes an inductive write element with a sensor read element (which will be described in greater detail with reference to FIG. 2). As the motor 14 rotates the magnetic disk 16, as indicated by the arrow R, an air bearing is formed under the transducer 24 causing it to lift slightly off of the surface of the magnetic disk 16, or, as it is sometimes termed in the art, to "fly" above the magnetic disk 16. Data bits can be written to and read from a magnetic "track" as the magnetic disk 16 rotates. Also, information from various tracks can be read from the magnetic disk 16 as the actuator 18 causes the transducer 24 to pivot in an arc as indicated by the arrows P. The width of a track is sometimes called the "trackwidth." Narrower trackwidths allow a greater number of tracks to be placed on a magnetic disk 16, thereby increasing its total storage capacity. The design and manufacture of magnetic disk data storage systems is well known to those skilled in the art.

FIG. 2 depicts a magnetic read/write head 24 of the prior art including a read element 26 and a write element 28. Surfaces of the read element 26 and write element 28 also define a portion of an air bearing surface ABS, in a plane 29, which can be aligned to face the surface of the magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor which is used to detect magnetic field signals from a magnetic medium through changing resistance in the read sensor.

The write element 28 is typically an inductive write element which includes a first pole 38 and the intermediate layer 32, which functions as a second pole. A second pole pedestal 42 is connected to a second pole tip portion 45 of the second pole. The first pole 38 and the second pole 32 are attached to each other by a backgap portion 40, with these three elements collectively forming a yoke 41 with the second pole pedestal 42. The area around the first pole tip portion 43 and a second pole tip portion 45 near the ABS is sometimes referred to as the yoke tip region 46. A write gap 36 is formed between the first pole 38 and the second pole pedestal 42 in the yoke tip region 46, and is formed from a non-magnetic electrically insulating material. This non-magnetic material can be either integral with or separate from (as shown here) a first insulation layer 47 that lies between the first pole 38 and the second pole 32, and extends from the yoke tip region 46 to the backgap portion 40.

Also included in write element 28 is a conductive coil layer 48, formed of multiple winds 49. The conductive coil 48 is positioned within a coil insulation layer 50 that lies below the first pole 38. The coil insulation layer 50 thereby electrically insulates the coil layer 48 from the first pole 38 and insulates the multiple winds 49 from each other, while the first insulation layer 47 electrically insulates the winds 49 from the second pole 32.

An inductive write head such as that shown in FIG. 2 operates by passing a writing current through the conductive coil layer 48. Because of the magnetic properties of the yoke 41, a magnetic flux can be induced in the first and second poles 38 and 32 by a write current passed through the coil layer 48. The write gap 36 allows the magnetic flux to fringe out from the yoke 41 (thus forming a fringing gap field) and to cross a magnetic recording medium that is placed proximate the ABS.

FIG. 3 shows an alternative magnetic write element 25 of the prior art including two conductive coil layers 60 and 62. The overall structure of magnetic write element 25 is similar to write element 28 and includes a first pole 38, a second pole 32, a backgap 40, a second pole pedestal 42, a write gap 36, and a first insulation layer 47. The primary differences between this prior art write element 25 and write element 28 of FIG. 2 is the additional write gap layer 27 of which the write gap 36 is part, and the arrangement of two stacked coil layers 60 and 62 rather than a single coil layer 48.

In write element 25 the write gap layer 27 may be formed of a non-magnetic electrically insulating material disposed above the first insulation layer 47. A first coil layer 60 is formed of first multiple winds 64 disposed above the write gap layer 27. The first multiple winds 64 are insulated from one another, and covered by, a second insulation layer 65. A second coil layer 62 is formed of second multiple winds 66 disposed above the second insulation layer 65. The second multiple winds are insulated from one another, and covered by, a third insulation layer 67. The first multiple winds 64 and the second multiple winds 66 are both formed of electrically conductive materials. The second insulating layer 65 and the third insulating layer 67 are both formed from non-magnetic electrically insulating materials. The second insulating layer 65 insulates the first coil layer 60 from the first pole 38 and from the second coil layer 62. The third insulating layer 67 insulates the second coil layer 62 from the first pole 38.

The write element 25 with two coil layers 60 and 62 has certain advantages over the write element 28 with one coil layer 48. Stacking multiple coil layers permits write element 25 to be more compact, shortening the distance from the backgap 40 to the second pole pedestal 42, a distance sometimes referred to as the yoke length YL. A shorter yoke length permits a shorter flux rise time, the length of time necessary for the fringing gap field across the write gap 36 to rise to its maximum intensity from its minimum intensity when an electric current is passed through the coil winds. The rate at which data may be written to a magnetic disk 16 increases as the flux rise time decreases. Therefore, a shorter yoke length allows higher data recording rates to be achieved.

Unfortunately, stacking multiple coil layers in a write element can be a disadvantage as well. Multiple coil layers can increase another parameter, sometimes referred to as the stack height SH, the distance between the top surface of the first pole 38 and the top of the second pole 32. The increased topography of the write element created by a larger stack height can make the formation of the first pole 38 more difficult, leading to both decreased performance and lower yields.

FIG. 4 shows a head gimbal assembly (HGA) according to the prior art. The head gimbal assembly includes a base 21 attached to a load beam 23. The load beam 23 includes an arm 20 attached between the base 21 and a suspension 22. The suspension 22 is attached to the arm 20 at a first end and is attached to a read/write head 24 at an opposite end. A pre-amp chip 142 is attached to the base 21. The pre-amp chip 142 is electrically connected to the read/write head 24 by a metallic interconnection 144 such as copper traces or wires. The metallic interconnection 144 carries electrical signals between the pre-amp chip 142 and the read/write head 24. In addition, the pre-amp chip 142 is connected to a controller connector 146 which can electrically connect the pre-amp chip to a controller (not shown). Thus, the pre amp-chip 142 is also configured to pass electric signals to and from the controller.

The pre-amp chip 142 is located on the base 21 to place it close to the read/write head 24. Shortening the distance between the pre-amp chip 142 and the read/write head 24 allows for a higher circuit resonant frequency, in turn allowing for higher data transfer rates. However, it is also necessary to match the impedance of the metallic interconnection 144 with the impedance of the read/write head 24 as failure to do so may degrade the signal. To match the impedance of prior art read/write heads 24, a metallic interconnection 144 of the prior art has had to be sufficiently long, as impedance in a conductor increases as a function of its length. Consequently, this has necessitated placing the pre-amp chip 142 further away from the read/write head 24 than would otherwise be desirable.

Thus, what is desired is a write element with a lower impedance that would allow a pre-amp chip to be located nearer to the write element and preferably on the load beam itself. Further, it is desired that fabrication of such a write element, and a read/write head incorporating the same, be inexpensive, quick, and simple.

SUMMARY OF THE INVENTION

The present invention provides a magnetic recording device and method for making the same having a specifically tailored impedance to allow for a pre-amp chip to be located on the load beam nearer to the recording device than previously possible.

In an embodiment of the present invention a recording device for recording data on a magnetic medium comprises a yoke, a write gap layer, two coil layers, and three insulation layers. The yoke, having a characteristic yoke length, comprises a first pole, a second pole, a backgap portion, and a first pole pedestal, each formed of ferromagnetic materials. The first and second poles each have a pole tip portion aligned with one another. Both poles are magnetically connected by way of the backgap portion, located distal their respective pole tip portions. The first pole pedestal is magnetically connected to, and aligned with, the first pole tip portion. Another embodiment is directed towards incorporating into the yoke a second pole pedestal, also formed of a ferromagnetic material, and situated between the write gap layer and the second pole.

The yoke forms a discontinuous ring with a single gap. Within the interior space defined by the yoke are a write gap layer, two coil layers, and three insulation layers. The write gap layer extends from the write gap region, the space between the first pole pedestal and the second pole tip portion, to the distal end of the second pole, and separates the turns of the first coil layer from the turns of the second coil layer. A first pole insulation layer insulates the first pole from the turns of the first coil layer, and a first coil insulation layer disposed between the turns of the first coil layer insulates those turns from one another. A second coil insulation layer insulates the turns of the second coil layer from each other and from the second pole. The write gap layer and each of the insulation layers may be formed of suitable non-magnetic and electrically insulating materials, while the turns of the two coil layers may be formed of electrically conductive materials. At a minimum, each coil layer has at least one turn.

This structure is advantageous because it allows for a shorter yoke length that reduces the device's flux rise time, thus, allowing for higher data recording rates. The placement of the write gap layer is also advantageous in this design because it limits the height of the first coil layer, thereby reducing the overall stack height of the device. Reducing the stack height facilitates the formation of the second pole.

Another embodiment of the present invention is a data transfer device for exchanging data with a magnetic medium comprising a load beam to which a recording device and a pre-amp chip are attached. The recording device is configured according to the embodiments previously described. The pre-amp chip is electrically connected to the recording device, and is connectable to a controller. The pre-amp chip is intended to pass electrical signals to and from both the controller and the recording device. Yet another embodiment is directed to locating the pre-amp chip at a sufficient distance from the recording device such that the impedance of the recording device and the impedance of a connector between the recording device and the pre-amp chip are substantially equal. Minimizing the impedance mismatch between the connector and the recording device while locating the pre-amp chip closer to the recording device is advantageous for decreasing the current rise time and the flux rise time, allowing for higher data transfer rates.

Still other embodiments include a read element, also connected to the pre-amp chip. Such a read element may include two shields and a read sensor, where the read sensor is disposed between a first shield and the first pole of the recording device configured to act as a second shield. Yet other embodiments additionally include a medium support and a read/write head support system. The medium support may further include a spindle on which the magnetic medium can be supported, and a medium motor capable of rotating the magnetic medium around the axis of the spindle. The read/write head support system further includes the load beam and pre-amp chip, and is intended to suspend the read/write head proximate to the magnetic medium.

In yet another embodiment of the present invention, a method for forming a recording device includes providing a first pole having a pole tip portion. The first pole is substantially planarized prior to forming a first pole pedestal above and magnetically connected to the first pole at its pole tip portion. A backgap portion is formed above and magnetically connected to the first pole distal to its pole tip portion. A first pole insulation material is deposited over the first pole pedestal, first pole, and backgap portion and a first pre-coil layer is formed above the first pole insulation layer. A first coil insulation layer is deposited over the first pre-coil layer and then substantially planarized to expose the first pole pedestal, first pre-coil layer, and backgap portion. A write gap layer is formed over the exposed first pole pedestal and first coil layer, and a second coil layer is formed above the write gap layer. A second coil insulation layer is formed over the second coil layer, and a second pole is formed over the write gap material and second coil insulation layer, and also over the backgap portion with which it is magnetically connected.

Further embodiments are directed to forming a second pole pedestal within the recording device, forming a read element connected to the recording device, attaching the recording device and the read element to a load beam, and attaching a pre-amp chip to the load beam, to the recording device, and to the read element. Still other embodiments include incorporating the recording device and read element within a read/write head, combining the read/write head with a suspension system, and providing a support system for supporting the magnetic medium proximate to the read/write head.

These and other advantages of the present invention will become apparent to those skilled in the art upon a reading of the following descriptions of the invention and upon studying the several figures of the drawings.

BRIEF DESCRIPTION OF THE DRAWINGS

The present invention will be readily understood by the following detailed description in conjunction with the accompanying drawings, and like reference numerals designate like elements.

DETAILED DESCRIPTION OF THE PREFERRED EMBODIMENTS

FIGS. 1A, 1B, and 2–4 were discussed with reference to the prior art.

Figure 1A:
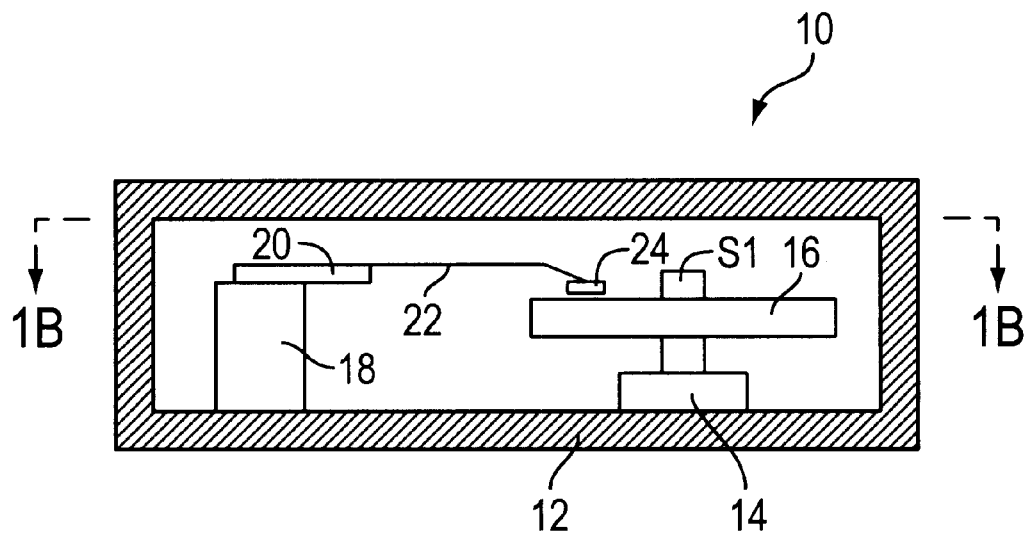
FIG. 1A is a partial cross-sectional elevation view of a magnetic data storage system.
Figure 1B:
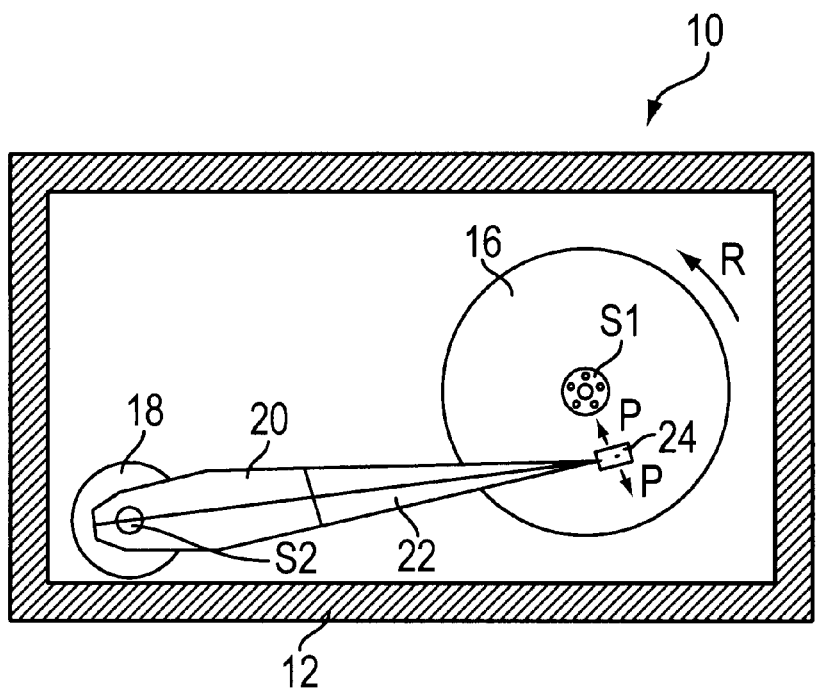
FIG. 1B is a top plan view along line 1B—1B of FIG. 1A.
Figure 2:
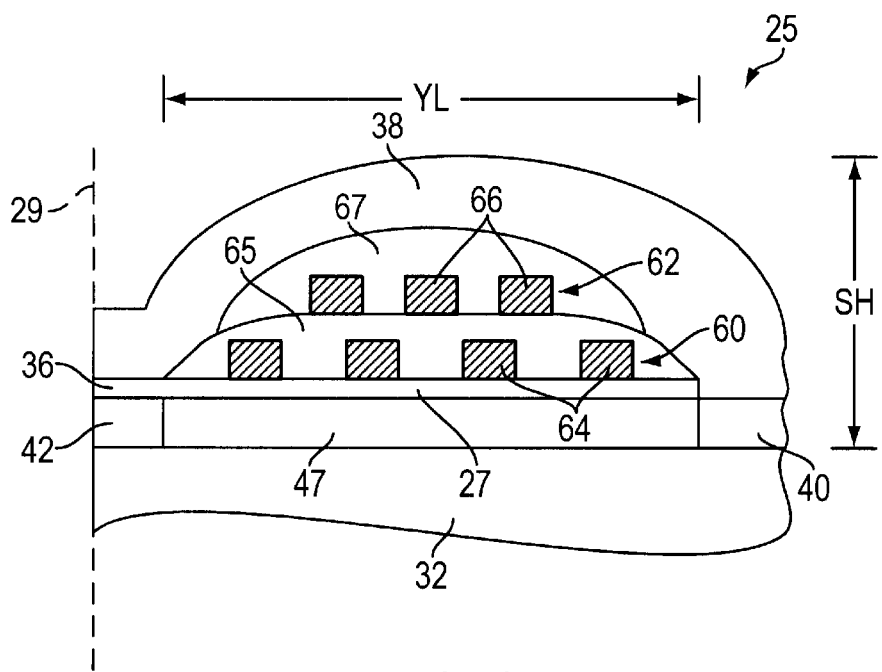
FIG. 2 is a cross-sectional view of a read/write head including a single coil layer according to the prior art.
Figure 3:
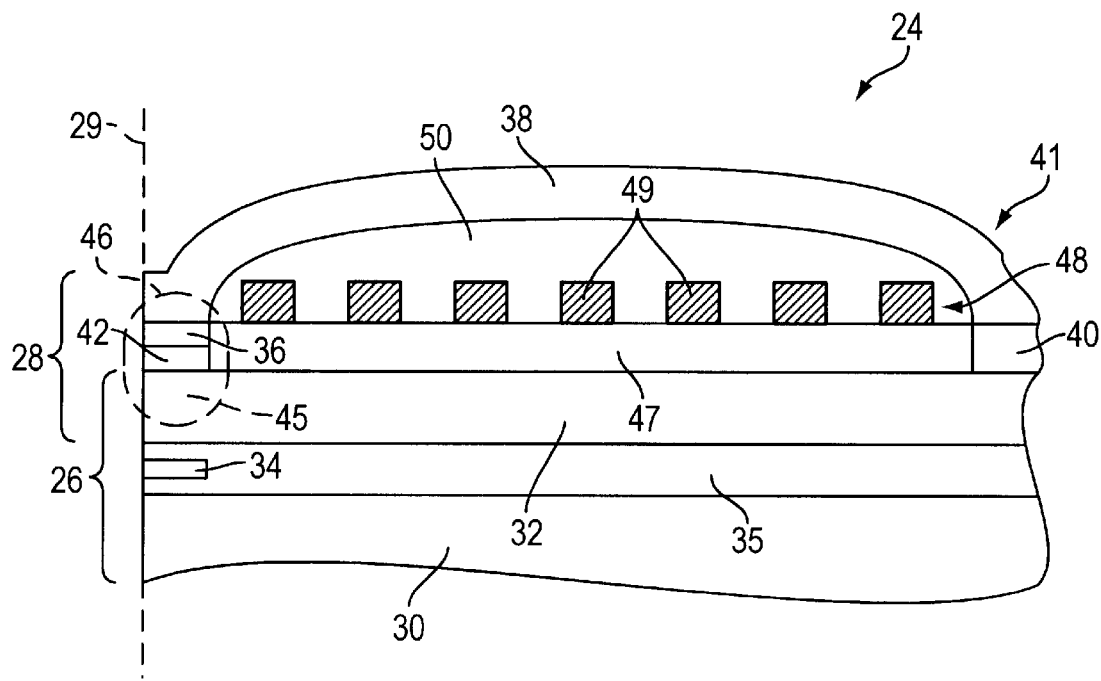
FIG. 3 is a cross-sectional view of a read/write head including two coil layers according to the prior art.
Figure 4:
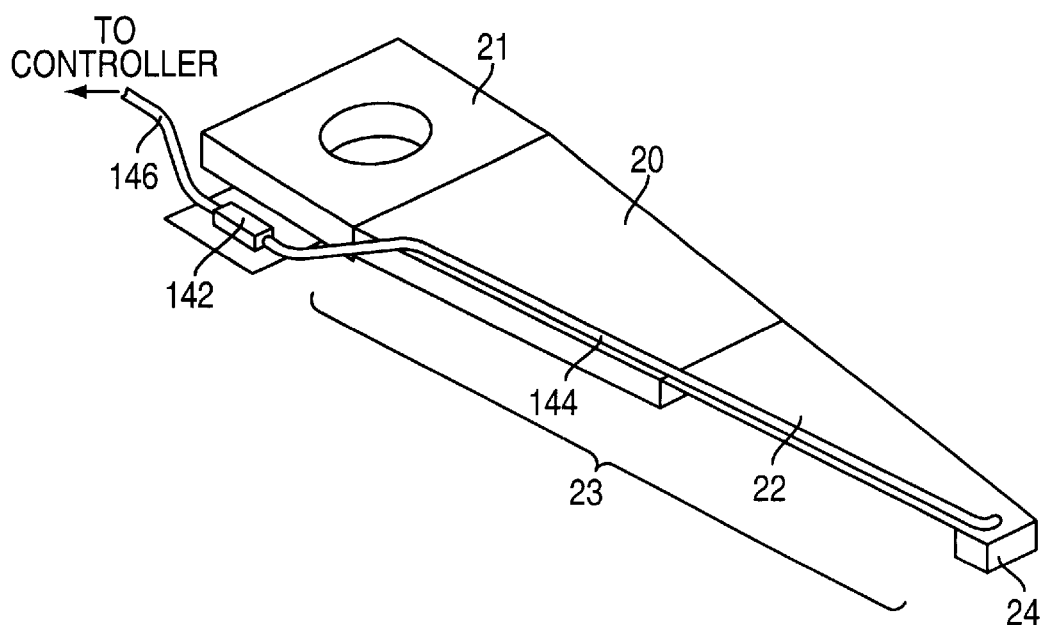
FIG. 4 is a perspective view of a head gimbal assembly (HGA) according to the prior art.
Figure 5:
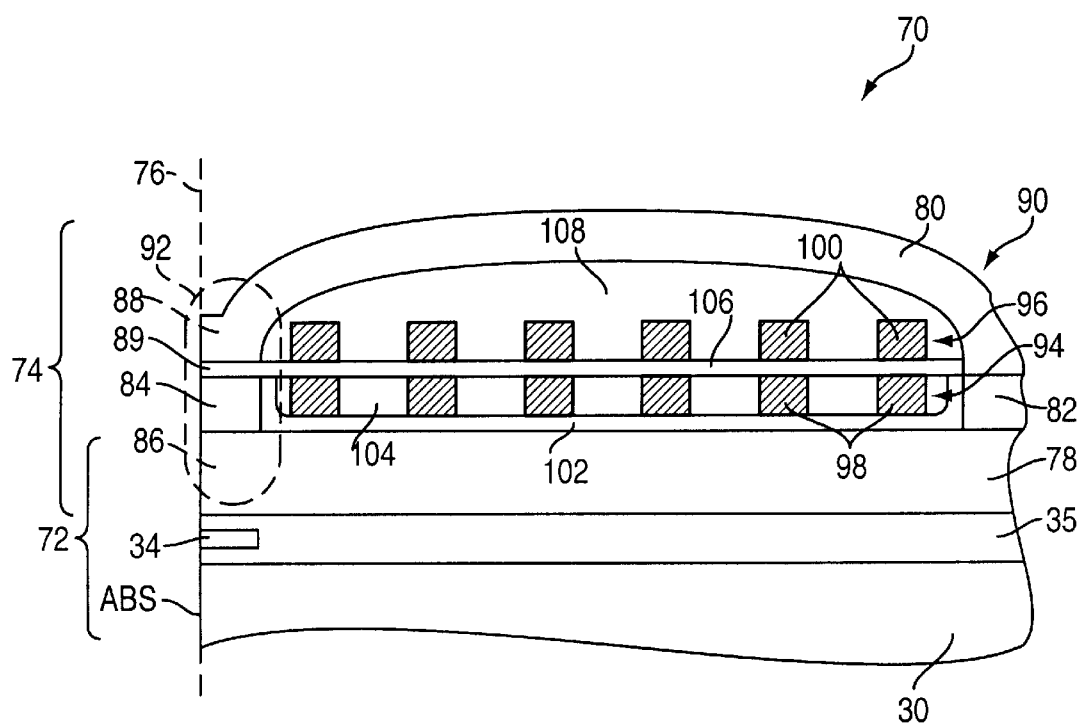
FIG. 5 is a cross sectional view of a read/write head according to an embodiment of the present invention.

FIG. 5 is a cross sectional view of a read/write head 70 of the present invention. The read/write head 70 includes a read element 72 and a write element 74. Both the read element 72 and write element 74 have surfaces that form part of an air bearing surface (ABS), in a plane 76, which can be aligned to face the surface of a magnetic disk 16 (see FIGS. 1A and 1B). The read element 72 includes a first shield 30, an intermediate layer 78, which functions as a second shield, and a read sensor 34 that is located within a dielectric medium 35 between the first shield 30 and the second shield 78. As with the prior art, the read sensor 34 can be a magnetoresistive sensor, such as an AMR or GMR sensor. Further, the first shield 30 and the second shield 78 can be formed of a ferromagnetic material, such as a nickel iron (NiFe) alloy.

The write element 74 includes the intermediate layer 78, which operates as a first pole, and a second pole 80 which is also formed of a ferromagnetic material, such as NiFe. The first pole 78 and the second pole 80 are connected by a backgap portion 82, located distal to the ABS, which is additionally formed of a ferromagnetic material, for example NiFe. A first pole pedestal 84 is connected to a first pole tip portion 86 of the first pole 78. Further, the first pole pedestal 84 is aligned with a second pole tip portion 88. Collectively, the first pole 78, second pole 80, first pole pedestal 84, and backgap portion 82 form a yoke 90. Additionally, the region of the write element 74 which includes the first pole pedestal 84, a first pole tip portion 86, and a second pole tip portion 88, is referred to as the yoke tip portion 92. Within the yoke tip portion 92 there is additionally a write gap 89 situated between the first pole pedestal 84 and the second pole tip region 88. The write gap 89 may be formed of any suitable electrically insulating, non-magnetic material such as Silicon dioxide ($SiO_2$).

A first coil layer 94, and a second coil layer 96 are disposed between the first pole 78 and the second pole 80. As is well known to those skilled in the art, the first and second coil layers 94, 96 can include one or more coil turns 98, 100, respectively that are formed of an electrically conductive material, such as copper. Also, as is well known in the art, the first coil layer 94 can be electrically connected with the second coil layer 96.

Both the first coil layer 94 and the second coil layer 96 are electrically insulated from the yoke 90. The first coil layer 94 is electrically insulated from the first pole 78 by a first pole insulation layer 102. The first pole insulation layer 102 extends from the first pole pedestal 84 to the backgap portion 82, and can be formed of any suitable electrically insulating, non-magnetic material such as silicon dioxide ($SiO_2$) or alumina ($Al_2O_3$). The first pole insulation layer 102 can be relatively thin, for example in the range of about 0.1 micron to about 0.5 micron. While the first coil turns 98 can be electrically connected in a spiral fashion as is know the art, they are transversely electrically insulated from adjacent other first coil turns 98 by a first coil insulation layer 104. The first coil insulation layer 104 can include discrete segments disposed between adjacent first coil turns 98 as well as between the first coil layer 94 and the backgap portion 82, and between the first coil layer 94 and the first pole pedestal 84. The first coil insulation layer 104 can be formed of any suitable non-magnetic, electrically insulating material, for example alumina ($Al_2O_3$). As shown in FIG. 5, the first pole insulation layer 102 also insulates the first coil layer 94 from the backgap portion 82 and the first pole pedestal 84. However, in other embodiments the only insulation between the first coil layer 94 and the first pole pedestal 84 may be the first coil insulation layer 104, or alternatively the only insulation may be the first pole insulation layer 102. Similarly, in other embodiments the only insulation between the first coil layer 94 and the backgap portion 82 may be the first coil insulation layer 104, or alternatively the only insulation may be the first pole insulation layer 102.

A write gap layer 106 is disposed above the first pole pedestal 84, the first coil layer 94 and the first coil insulation layer 104. The write gap layer 106 can be formed of any suitable non-magnetic, electrically insulating material, such as alumina or silicon dioxide. Thus, the write gap layer 106 may also be coextensive with the write gap 89 and electrically insulate the first coil layer 94 form the second coil layer 96. A second coil insulation layer 108 covers the second coil layer 96, including between adjacent second coil turns 100. In this way, the second coil insulation layer 108 provides electrical insulation between adjacent second coil turns 100, and between the second coil layer 96 and the second pole 80. The second coil insulation layer 108 can be formed of any suitable non-magnetic, electrically insulating material, such as alumina, or cured photo resistive material, sometime referred to as "photoresist."

Figure 6:
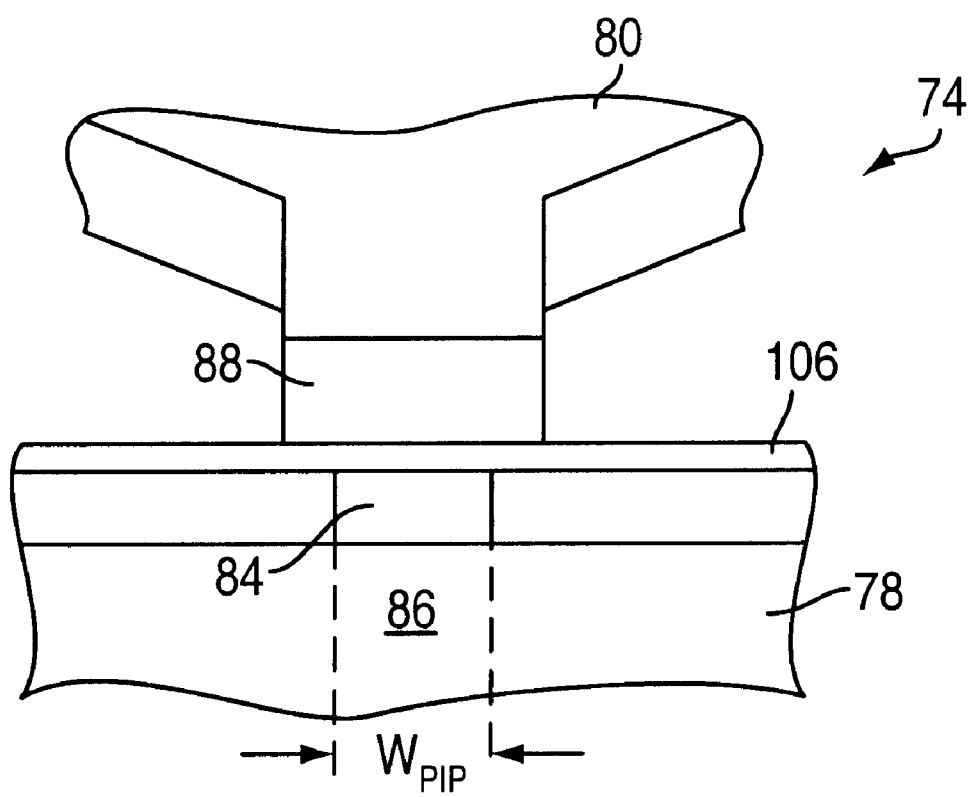
FIG. 6 is an ABS view of a write element of the read/write head according to an embodiment of the present invention.

FIG. 6 is an ABS view of a write element 74 of the read/write head 70, according to an embodiment of the present invention. As can be seen from FIG. 6, a width WP1P of an edge the first pole pedestal 84 at the ABS is narrower than the first pole tip portion 86 of the first pole 78, and also narrower than the second pole tip portion 88 of the second pole 80. Since a trackwidth of the write element 74 is effectively equal to the smallest width of the two components adjoining the write gap, the width WP1P of the edge of the first pole pedestal 84 essentially defines the trackwidth for the write element 74. Preferably, the width of the edge of the first pole pedestal 84 is in the range of about 0.2 micron to about 1.0 micron.

Figure 7:
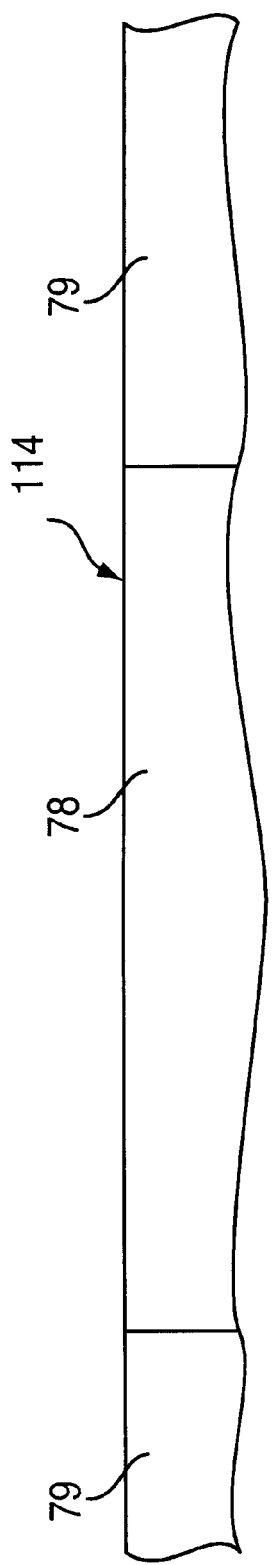
FIGS. 7–12 are cross-sectional views of a read/write head at various stages of fabrication, according to an embodiment of the present invention.

FIGS. 7–12 are cross-sectional views depicting the formation of the write element 74 at different stages of fabrication, according to another embodiment of the present invention. As shown in FIG. 7, a first pole 78 surrounded by a build up layer 79 is provided. The first pole can be formed of any suitable ferromagnetic material, such as NiFe. In addition, the build up layer 79 can be formed of any suitable non magnetic, electrically insulating material, such as alumina. The first pole 78 and buildup layer 79 can be planerized to form a substantially planer upper surface 114. For example, the planerization can be performed using known techniques such as chemical mechanical polishing (CMP), or any other technique that result in a surface 114 that is substantially planer.

Figure 8:
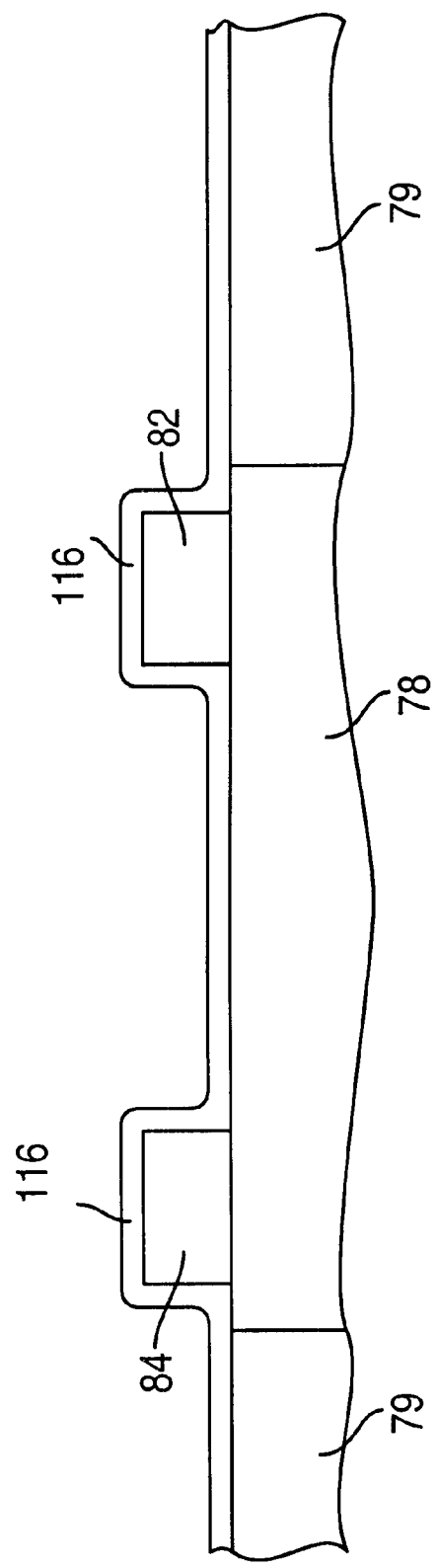

As shown in FIG. 8, a first pole pedestal 84 and a backgap portion 82 are formed above and electrically connected to the first pole 78. The first pole pedestal 84 and backgap portion 82 can be formed by any suitable method, including various methods and techniques known to those skilled in the art. For example, a first patterned plating mask can be formed above the first pole 78. Such a mask can be formed, for example, by patterning photoresist as is well known in the art. A ferromagnetic material can then be plated over the first pole 78 with the first patterned plating mask in place. The ferromagnetic material can be any material having desirable magnetic properties, for example NiFe. The patterned plating mask is then removed, leaving the first pole pedestal 84 and back gap portion 82 above the first pole 78. Also shown in FIG. 8, a first pole insulation material 116 is deposited over the first pole pedestal 84 and backgap portion 82, as well as the first pole 78. The first pole insulation material can be any suitable non-magnetic, electrically insulating material, such as silicon dioxide, and can be deposited using techniques well known in the art.

Figure 9:
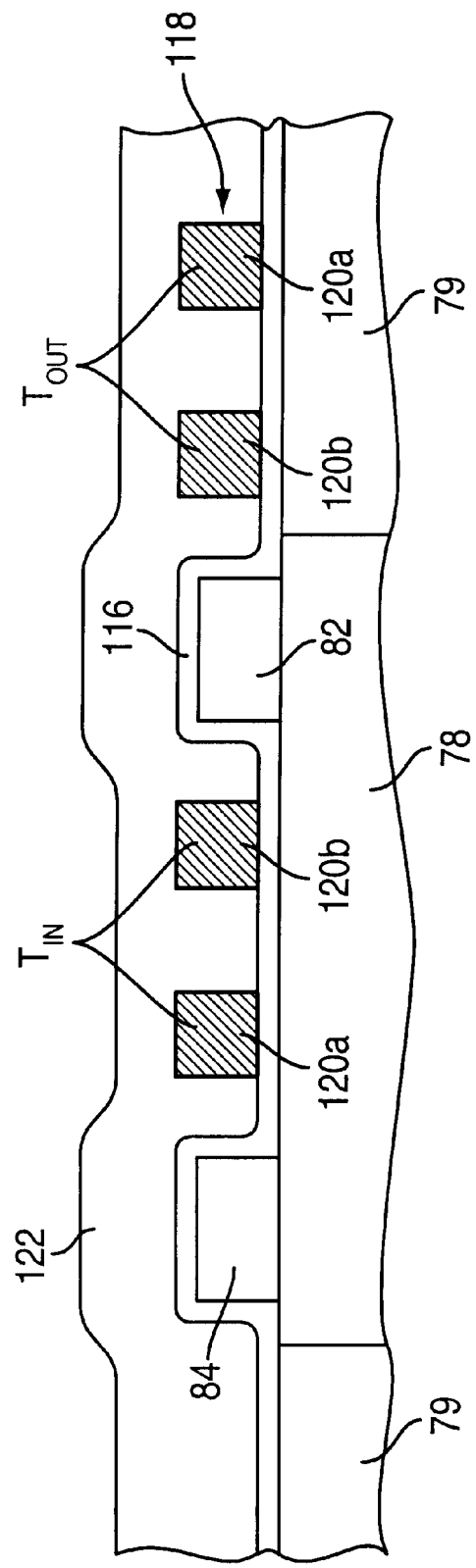

FIG. 9 depicts the formation of a first pre-coil layer 118 above the first pole insulation material 116. The first pre-coil layer 118 can include one or more first pre-coil turns 120. The pre-coil turns 120 can be spirally connected, as is well known in the art, i.e., each pre-coil turn 120 can be electrically connected in series with an adjacent pre-coil turn 120. As is also well known in the art, the first pre-coil turns 120 can wind around the backgap portion 82, with an inside portion Tin of the pre-coil turns 120 disposed between the first pole pedestal 84 and the backgap portion 82, and an outside portion Tout of the first pre-coil turns 120 disposed on a side of the backgap portion 82 opposite from the first pole pedestal 84. Thus, a single turn 120a appears in cross section in FIG. 9 on opposite sides of the backgap portion 82, as does another turn 120b that is positioned within the first turn 120a.

The first pre-coil layer can be formed of any suitable electrically conductive material, such as copper. The first pre-coil layer can be formed using known methods, for example by platting. More specifically, a second patterned mask can be formed above the first pole insulation material 116. A first electrically conductive material can then be plated over the first pole insulation material 116 with the second patterned plating mask in place. When the second patterned plating mask is removed, the first pre-coil layer remains above the first pole insulation layer 116. Over the first pole insulation layer 116 and the first pre-coil layer 118 is deposited a first coil insulation layer material 122. The first coil insulation material can be formed of any suitable non-magnetic electrically insulating material, such as alumina or silicon dioxide.

Figure 10:
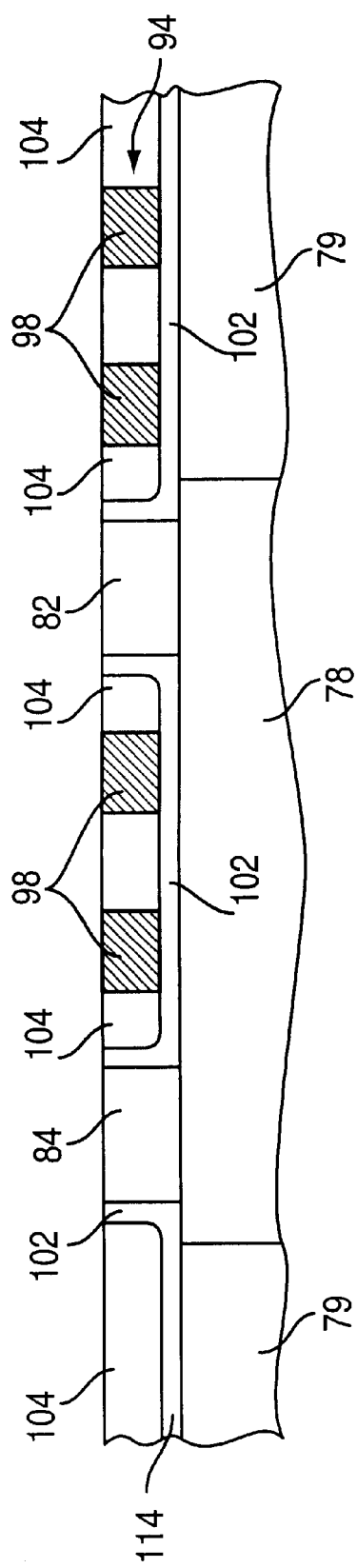

The first coil insulation layer material 122 and the first pole insulation material 116 are then substantially planerized to expose the first pole pedestal 84, the backgap portion 82, and the first pre-coil layer 118, as is shown in FIG. 10. This planerization can be performed by any known method, for example chemical mechanical polishing. Such planerization may be continued beyond simply exposing the first pole pedestal 84, the backgap portion 82, and the first pre-coil layer 118, and may also include planerization of the first pole pedestal 84, backgap portion 82, and first pre-coil layer 118 themselves. After the planerization, the remaining portion of the first pre-coil layer 118 forms a first coil layer 94 having one or more first coil turns 98. [e.g., two first coil turns 98 are shown in FIG. 10] This planerization process substantially defines the dimension of the first pole pedestal 84, backgap portion 82, and first coil layer 124 in the direction perpendicular to surface 114.

Figure 11:
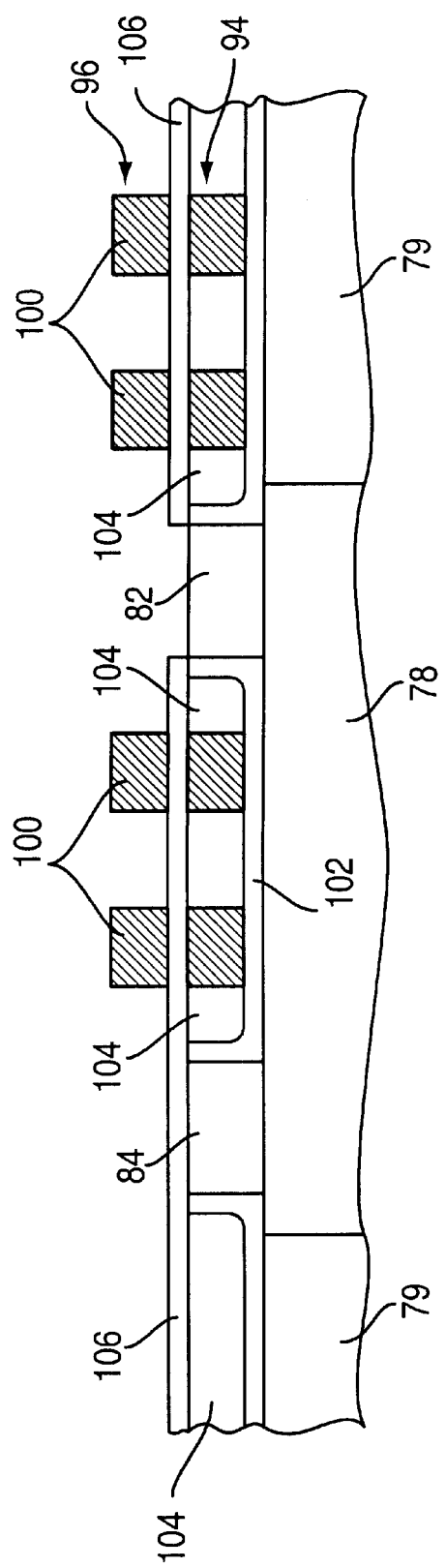

As depicted in FIG. 11, a write gap layer 106 is formed over the exposed first pole pedestal 84 and the first coil layer 94. Importantly, the backgap portion 82 remains exposed. The write gap material layer 106 can be formed of any suitable non-magnetic, electrically insulating material, such as alumina. A second coil layer 96 is then formed above the write gap layer 106. The second coil layer is formed of any suitable electrically conductive material, such as copper, and includes one or more second coil turns 100. The second coil layer 96 can be formed using a variety of known methods and/or techniques. For example, a third patterned plating mask can be formed above the write gap layer 106. A second electrically conductive material can then be plated above the write gap layer 106 with the third patterned plating mask in place. The second electrically conductive material can be the same or a different material than the first electrically conductive material, for example copper can be used. The third patterned plating mask can then be removed, with the remaining second conductive material forming the second coil layer 96.

Figure 12:
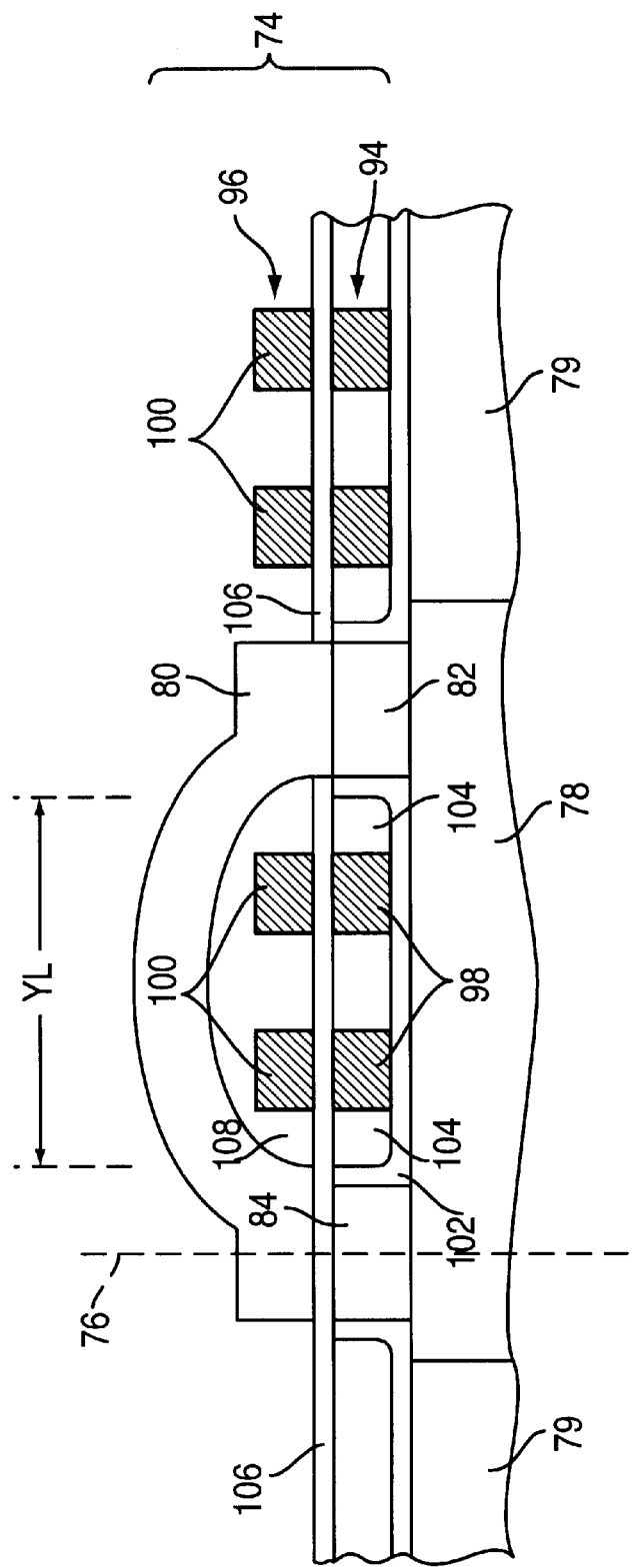

A second coil insulation layer 108, shown in FIG. 12 is formed over a second coil layer 96, including filling the spaces between adjacent second coil turns 100. The second coil insulation layer 108 can be formed of any suitable non magnetic, electrically insulating material, such as cured photoresist.

A second pole 80 is then formed over the write gap layer 106, backgap portion 82, and second coil insulation layer 108. The second pole 80 can be formed of any suitable ferromagnetic material, such as NiFe, and can be formed using any of a variety of known methods and techniques, for example, masking and plating. The formation of the read/write head 70 can additionally include the formation of other elements, such as an overcoat layer above the second pole. Once the wafer level fabrication is complete, the read/write head 70 can be cut from the wafer and lapped to form an ABS in the plane 76.

It should be noted that the completed write element 74 shown in FIG. 12 can include only a total of four coil turns while maintaining a yoke length YL of about 5 microns. Of course, additional coil turns can be included in one or both of the first coil layer 94, and the second coil layer 96. For example, a total of about 2 to about 15 coil turns can be included, with even more coil turns being included if desired. To accommodate this range of coil turns, the yoke length YL of the write element 74 can be in the range of about 3 microns to about 35 microns.

Figure 13:
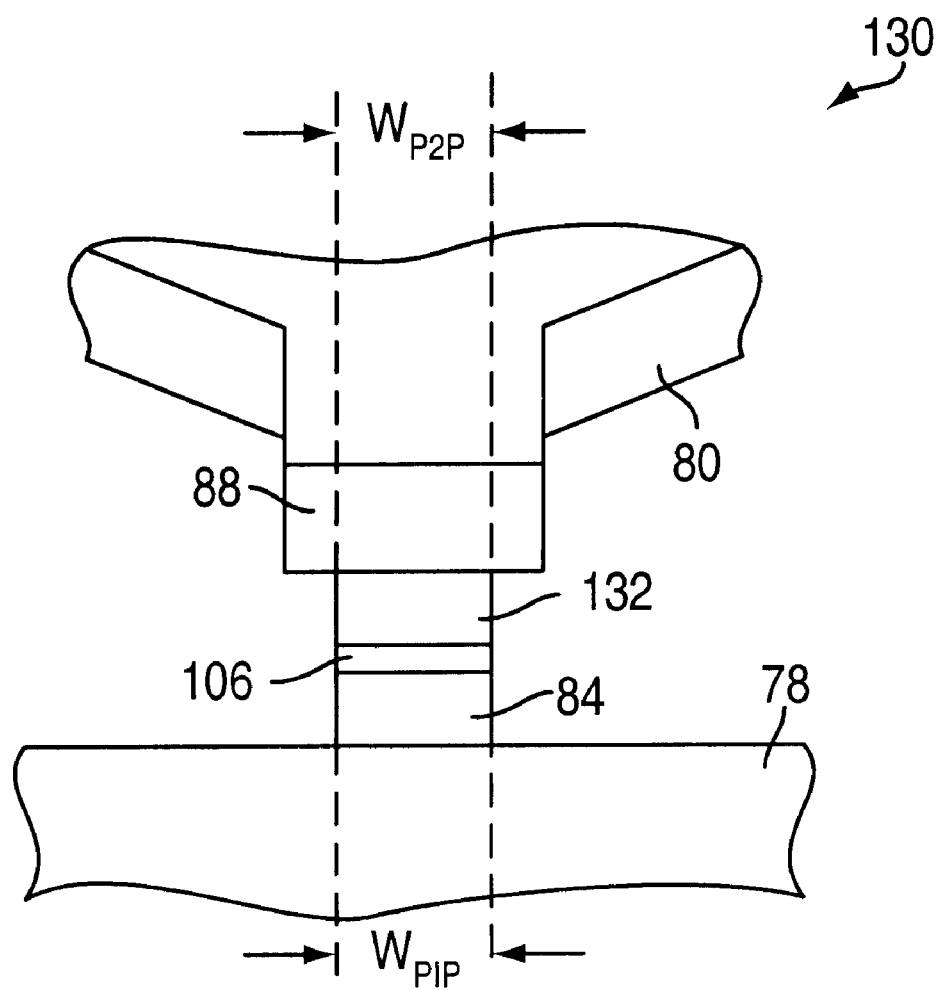
FIG. 13 is an ABS view of a write element of the read/write head according to another embodiment of the present invention.

FIG. 13 shows another embodiment of the present invention in which a write element 130 can further include a second pole pedestal 132 electrically connected to the second pole tip portion 88 of the second pole 80. The second pole pedestal 132 can be formed of any suitable ferromagnetic material, such as NiFe. In such a configuration, the write gap 89 is defined between the first pole pedestal 84, and the second pole pedestal 132. To form the write element 130, a second pole pedestal 132 can be formed above the write gap layer 106 before formation of the second pole 80. The width WP2P of the second pole pedestal 132 can be defined during plating of ferromagnetic material with a patterned plating mask. Alternatively, before formation of the second pole 80, the width WP2P can be defined by etching or by ion milling. In addition, at the time the second pole pedestal 132 is being defined by ion milling, the width WP1P of the first pole pedestal 84 can also be narrowed by ion milling. In such a case, the first pole pedestal 84 can be plated wider than the desired final width WP1P. Thus, the width WP2P of the second pole pedestal 132, can be defined as substantially equal to the width WP1P of the first pole pedestal 84.

In yet another embodiment, a second pole 80 of the write element 74 shown in FIG. 5, can be formed with a second pole tip portion 88 that is narrower than the first pole pedestal 84 and the first pole tip portion 86 at the ABS. With such a configuration, the track width of the write element 74 is instead a function of the second pole tip portion 88 width at the ABS rather than the width WP1P of the edge of the first pole pedestal.

Figure 14:
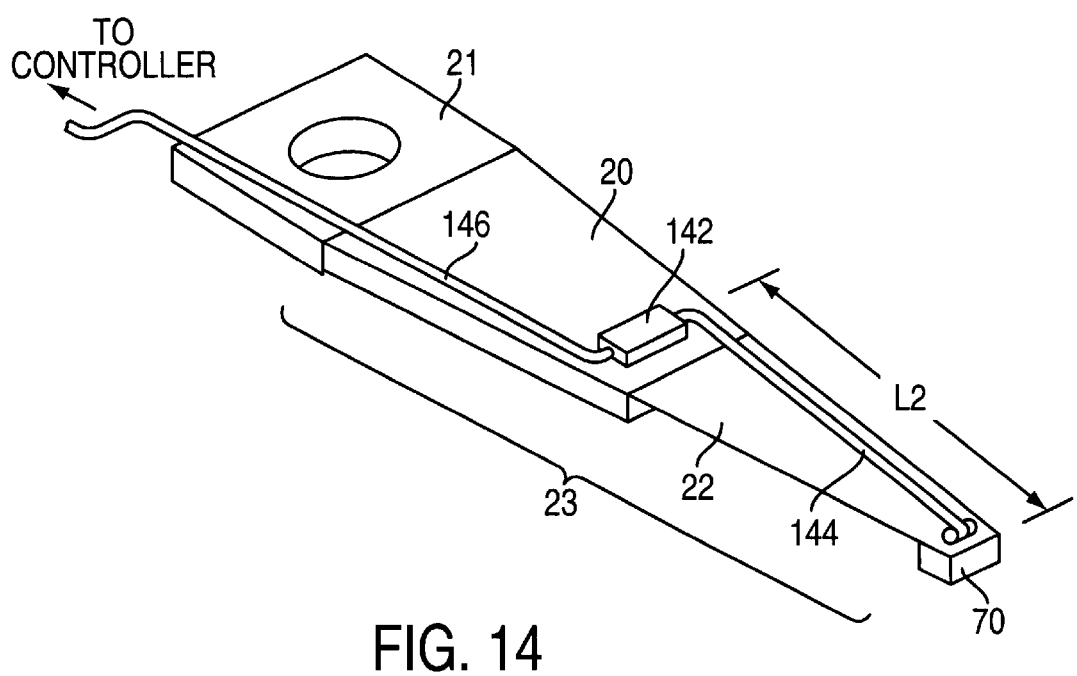
FIG. 14 is a perspective view of a head gimbal assembly (HGA) according to an embodiment of the present invention.

FIG. 14 shows a head gimbal assembly (HGA) which includes a base 21 attached to a load beam 23. The load beam 23 includes an arm 20 attached between the base 21 and a suspension 22. The suspension 22 is attached to the arm 20 at a first end and is attached to a read/write head 70 at an opposite end. A pre-amp chip 142 is also located on the load beam 23, for example on the arm 20 as shown in FIG. 14. The pre-amp chip 142 is electrically connected to the read/write head 70 via a metallic interconnection 144. The metallic interconnection 144 carries electrical signals between the pre-amp chip 142 and the read/write head 70. In addition, the pre-amp chip 142 is connected to a controller connector 146 that can electrically connect the pre-amp chip to a controller (not shown). Thus, the pre amp-chip 142 is also configured to pass electric signals to and from the controller.

By locating the pre-amp chip 142 closer to the read/write head 70, the metallic interconnection 144 can have a length L2 that is shorter than the head connector length of the prior art (See FIG. 4), and preferably in the range of 10 mm to 20 mm. With this shorter length L2 the impedance of the metallic interconnection 144 is reduced over the prior art. An advantage of the lower impedance in metallic interconnection 144 is it further leads to a decrease in the current rise time of the recording current that is passed through the coil layers 94 and 96. This reduction in current rise time further reduces the flux rise time at the write gap 89. Thus, decreasing L2 may lead to higher data recording rates.

To avoid an impedance mismatch between the metallic interconnection 144 and the read/write head 70, and particularly with the write element 74, the configuration of the present invention can be used. For example the write element 70 of the present invention can be formed with a total of four coil turns which can cause the write element 74 to exhibit an impedance of about 3 nanohenrys (nh), substantially similar to the impedance of a head connector having a length L2. Further, because the total number of turns can be included in two different coil layers 94 and 96, the yoke length YL of the write element 74 can be shorter than if the total number of coil turns were included in a single coil layer. For example, with a total of four coil turns, the yoke length YL can be about 5 microns. This shorter yoke length YL further facilitates a shorter flux rise time than would be exhibited by a single coil layer of 4 turns. This further reduced flux rise time allows even higher data transfer rates to be achieved. For example, maximum data rates can be achieved of over about 2 gigabytes per second (Gb/s). In addition, with the first coil layer 94 disposed below the write gap layer 106, the stack height SH of the write element 74 (see FIG. 12) is maintained substantially the same as a write element including only a single coil layer. Thus, difficulties in the formation of the second pole 80 can be substantially avoided, while providing a greater number of turns, and therefore providing a higher magnetic motive force given the same write current. As an additional advantage, each of the above advantages can be realized with the use of existing fabrication methods, processes, and techniques, while maintaining a desirable time and cost of fabrication with a satisfactory fabrication yield.

In summary, the present invention provides structures and methods for providing a magnetic recording device with a chip on load-beam arrangement in which the impedance of the head connector is substantially similar to the impedance of the write element. This design allows for the pre-amp chip to be located closer to the recording device for higher data transfer rates. The invention has been described herein in terms of several preferred embodiments. Other embodiments of the invention, including alternatives, modifications, permutations and equivalents of the embodiments described herein, will be apparent to those skilled in the art from consideration of the specification, study of the drawings, and practice of the invention. The embodiments and preferred features described above should be considered exemplary, with the invention being defined by the appended claims, which therefore include all such alternatives, modifications, permutations and equivalents as fall within the true spirit and scope of the present invention.

What is claimed is:

1. A recording device for recording data on a magnetic medium, comprising:
    a first pole including a first pole tip portion;
    a second pole including a second pole tip portion aligned with said first pole tip portion;
    a backgap portion connecting said first pole to said second pole distal said first pole tip portion and said second pole tip portion;

a first pole pedestal, including a top surface defining a plane, connected to said first pole tip portion, and aligned with said second pole tip portion, said first pole, said second pole, wherein said backgap portion, and said first pole pedestal form a yoke having a characteristic yoke length;

a first pole insulation layer disposed above said first pole;

a first coil layer including at least one first coil turn disposed above said first pole insulation layer, said first coil layer having a top surface substantially coplanar with said plane;

a second coil layer disposed above said first coil layer and including at least one second coil turn;

a write gap layer disposed between said first pole pedestal and said second pole tip portion and directly between said first coil layer and said second coil layer; and a coil insulation layer disposed above said write gap layer and covering said second coil layer, said second pole being disposed over said second coil insulation layer.

2. The recording device recited in claim 1, wherein said yoke length is in the range of about 3 microns to about 35 microns and wherein a sum of said first coil layer turns and said second coil layer turns is in the range of about 4 to about 15.

3. The recording device recited in claim 2, wherein said first coil layer includes no more than two first coil layer turns, said second coil layer includes no more than two second coil layer turns, and said yoke length is in the range of about 3 microns to about 7 microns.

4. The recording device recited in claim 1, wherein said first pole pedestal includes an edge that forms an air bearing surface, and wherein a trackwidth of said recording device is a function of a width of said edge.

5. The recording device recited in claim 4, wherein said width of said edge is in the range of about 0.2 micron to about 1.0 micron.

6. The recording device recited in claim 1, further comprising:

a second pole pedestal disposed between said write gap layer and said second pole, and connected to said second pole, wherein said yoke includes said second pole pedestal.

7. A data transfer device for exchanging data with a magnetic medium, comprising:

a recording device including;
  a first pole including a first pole tip portion;
  a second pole including a second pole tip portion aligned with said first pole tip portion;
  a backgap portion connecting said first pole to said second pole distal said first pole tip portion and said second pole tip portion;
  a first pole pedestal, including a top surface defining a plane, connected to said first pole tip portion, and aligned with said second pole tip portion, wherein said first pole, said second pole, said backgap portion, and said first pole pedestal form a yoke having a characteristic yoke length;
  a first pole insulation layer disposed above said first pole;
  a first coil layer including at least one first coil turn disposed above said first pole insulation layer, said first coil layer having a top surface substantially coplanar with said plane;
  a second coil layer spaced above said first coil layer and including at least one second coil turn;
  a write gap layer disposed between said first pole pedestal and said second pole tip portion and directly between said first coil layer and said second coil layer; and
  a coil insulation layer disposed above said write gap layer and covering said second coil layer, said second pole being disposed over said second coil insulation layer;

a load beam to which said recording device is affixed; and a pre-amp chip disposed on said load beam, electrically connected to said recording device, and configured to be electrically connected to a controller and to pass electrical signals to and from said controller and said recording device.

8. The data transfer device recited in claim 7, wherein a distance between said recording device and said pre-amp chip is in the range of about 5 mm to about 25 mm.

9. The data transfer device recited in claim 7, further comprising:

a read element for accessing data on said magnetic medium, said read element being connected to said recording device and being electrically connected to said pre-amp chip.

10. The data transfer device recited in claim 9, wherein said read element includes:

a first shield;

a read sensor disposed between said first shield and said first pole, wherein said first pole is configured to provide a second shield for said read sensor.

11. The data transfer device recited in claim 9, further comprising:

a medium support that is capable of supporting said magnetic medium and moving said magnetic medium in relation to a read/write head that includes said recording device and said read element; and a read/write head support system for suspending said read/write head above said medium, said support system including said load beam and said pre-amp chip.

12. The device as recited in claim 11, wherein said read/write head support system includes means for moving said read/write head relative to said medium.

13. The device as recited in claim 11, wherein said medium support includes:

a spindle on which said medium can be supported, having an axis about which said medium can rotate; and a medium motor connected to said spindle and capable of facilitating said moving of said medium relative to said read/write head.

14. The data transfer device recited in claim 7, wherein said yoke length is in the range of about 3 microns to about 35 microns and wherein a sum of said first coil layer turns and said second coil layer turns is in the range of about 4 to about 15.

15. The data transfer device recited in claim 14, wherein said first coil layer includes no more than two first coil layer turns, said second coil layer includes no more than two second coil layer turns, and said yoke length is in the range of about 3 microns to about 7 microns.

16. The data transfer device recited in claim 7, wherein said pre-amp chip is located sufficiently distant from said recording device such that an impedance of a connector between said recording device and said pre-amp chip is substantially equal to an impedance of said recording device.

* * * * *